(12) United States Patent
Joye

(10) Patent No.: US 9,033,084 B2
(45) Date of Patent: May 19, 2015

(54) BATTERY BOX FOR ELECTRIC OR HYBRID VEHICLE AND METHOD FOR MOUNTING SAID BOX ON THE VEHICLE

(75) Inventor: Olivier Joye, Clermont-Ferrand Cedex 9 (FR)

(73) Assignees: COMPAGNIE GENERALE DES ETABLISSEMENTS MICHELIN, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 37 days.

(21) Appl. No.: 13/695,604

(22) PCT Filed: Apr. 18, 2011

(86) PCT No.: PCT/EP2011/056141
§ 371 (c)(1),
(2), (4) Date: Dec. 19, 2012

(87) PCT Pub. No.: WO2011/134824
PCT Pub. Date: Nov. 3, 2011

(65) Prior Publication Data
US 2013/0192913 A1    Aug. 1, 2013

(30) Foreign Application Priority Data
Apr. 28, 2010    (FR) ..................... 10 53290

(51) Int. Cl.
*B60K 1/04*      (2006.01)
*B60L 11/18*     (2006.01)
*H01M 2/10*      (2006.01)
*B23P 11/00*     (2006.01)

(52) U.S. Cl.
CPC ........... *B60K 1/04* (2013.01); *B60K 2001/0438* (2013.01); *B60K 2001/0455* (2013.01); *B60K 2001/0472* (2013.01); *B60L 11/1822* (2013.01); *B60L 11/1877* (2013.01); *B60L 11/1879* (2013.01); *H01M 2/1083* (2013.01); *Y02T 10/7005* (2013.01); *Y02T 10/705* (2013.01); *Y02T 10/7072* (2013.01); *Y02T 90/124* (2013.01); *Y02T 90/14* (2013.01); *B23P 11/00* (2013.01)

(58) Field of Classification Search
CPC ................. B60K 1/04; B60K 2001/04; B60K 2001/0438; B60K 2001/0455; B60K 2001/0472; H01M 2/1072; H01M 2/1083
USPC .................. 180/68.5; 903/951, 952; 429/100
See application file for complete search history.

(56) References Cited

U.S. PATENT DOCUMENTS 4,365,681 A * 12/1982 Singh ........................... 180/68.5
(Continued)

FOREIGN PATENT DOCUMENTS

JP    2007 134138    5/2007
WO    WO 97/28016    8/1997

*Primary Examiner* — Frank Vanaman
(74) *Attorney, Agent, or Firm* — Cozen O'Connor

(57) ABSTRACT

Vehicle battery box (1) comprising at least one outer casing (2) delimiting a chamber (3) receiving the battery (9) and comprising a support (4) and a removable cover (5) connected to each other, the box (1) comprising positioning lugs (15, 16) and lugs (17, 18) for fixing said battery box (1) to the vehicle, said positioning lugs (15, 16) and said fixing lugs (17, 18) being mounted on the outer casing (2). Each positioning lug (15, 16) comprises a passage (19c, 20c) receiving a positioning stud (37).

11 Claims, 5 Drawing Sheets

(56) References Cited

U.S. PATENT DOCUMENTS

| | | |
|---|---|---|
| 5,392,873 A | 2/1995 | Masuyama et al. |
| 5,534,364 A * | 7/1996 | Watanabe et al. ............... 429/61 |
| 5,612,606 A * | 3/1997 | Guimarin et al. ............. 320/109 |
| 5,639,571 A * | 6/1997 | Waters et al. .................. 429/71 |
| 6,197,444 B1 * | 3/2001 | Vackar ............................ 429/99 |
| 7,410,020 B2 * | 8/2008 | Kikuchi et al. .............. 180/68.5 |
| 2007/0289789 A1 * | 12/2007 | Tsuchiya ..................... 180/68.2 |
| 2009/0236162 A1 | 9/2009 | Takasaki et al. |

* cited by examiner

BATTERY BOX FOR ELECTRIC OR HYBRID VEHICLE AND METHOD FOR MOUNTING SAID BOX ON THE VEHICLE

RELATED APPLICATIONS

This is a U.S. National Phase Application under 35 USC 371 of International Application PCT/EP2011/056141 filed on Apr. 18, 2011.

This application claims the priority of French application no. 10/53290 filed Apr. 28, 2010, the entire content of which is hereby incorporated by reference.

FIELD OF THE INVENTION

The present invention concerns the field of electric or hybrid propulsion vehicles, notably motor vehicles.

By "electric motor vehicle" is meant a vehicle as defined in United Nations regulation N° 100 concerning type approval of battery-powered electric vehicles.

The present invention concerns more particularly battery boxes situated under the floor of such an electric motor vehicle.

BACKGROUND OF THE INVENTION

A battery is formed with one or more storage cell assemblies enabling production of electrical energy for driving the electric or hybrid vehicle.

A battery box may comprise a chamber receiving electrical energy storage cell element units connected to an electrical or electronic device by an isolator in order to manage the transmission of electrical energy to the vehicle. The units of electrical energy storage cell elements are placed in the battery box, after which the battery box is mounted under the chassis of the vehicle. If an energy storage cell element or the whole of a unit is faulty, the battery box must be separated from the vehicle in order to repair or replace the defective element. Installing the battery box under the vehicle makes manipulation of the box somewhat difficult. It is difficult to position the battery box blind in order to fix it to the vehicle. In this regard see the document WO 97/28016 which describes a motor vehicle including a compartment to receive a battery box and a mobile rod pivoting between a position of receiving the battery box and a position of closing the compartment enabling both retention of the box in the compartment and electrical connection to the motor vehicle. However, the positioning of the battery box in the compartment is effected with the aid of two longitudinal ribs fixed to each side of the box designed to cooperate with the compartment.

SUMMARY OF THE INVENTION

One object of the invention is to facilitate mounting a battery box on a vehicle in order to obtain fast and easy mounting and demounting of the battery box on the vehicle.

One embodiment of the invention concerns a vehicle battery box comprising at least one outer casing delimiting a chamber receiving the battery and comprising a support and a removable cover placed one above the other and connected to each other.

The battery box comprises positioning lugs and lugs for fixing said battery box to a vehicle, said positioning lugs and said fixing lugs being mounted on the external frame.

Thus the battery box is easily and quickly positioned by the positioning lugs and then fixed by the fixing lugs.

Two positioning lugs may be sufficient. Each positioning lug advantageously comprises a passage receiving a positioning stud.

Each positioning stud may have one threaded end and one conical end, the conical end being adapted to be inserted in the passage receiving the positioning lug.

Each positioning lug advantageously comprises two interconnected L-shaped brackets, said brackets being fixed to the outer casing of the battery box.

In another embodiment, the battery box comprises a second outer casing delimiting a second battery receiving chamber and comprising a cover placed over the first cover.

In this embodiment, one of the positioning lugs advantageously comprises two additional brackets connected to the first two brackets and mounted on the second outer casing.

The battery box may comprise internal partitions delimiting compartments in said receiving chamber, said compartments being adapted to receive energy storage cell units.

The battery box preferably further includes at least one exterior recess receiving a removable member of an isolator connected to the battery.

In a second aspect, the invention concerns a method of mounting a battery box on a vehicle, said battery box comprising at least one outer casing delimiting a chamber receiving the battery and comprising a support and a removable cover placed on above the other and connected to each other. According to this mounting method, positioning studs are first screwed to the vehicle and the battery box is then placed on the vehicle so that the positioning studs are inserted in positioning lugs provided on said battery box. The battery box is then fixed to the vehicle by means of fixing lugs provided on the battery box.

Two positioning studs may be fixed to the vehicle, for example.

It is advantageous if the vehicle is lowered and/or the battery box is raised to carry out the positioning step.

Each positioning stud may have a threaded end and a conical end adapted to be inserted in a receiving passage provided on the positioning lugs.

Moreover, the fixing lugs may be bolted to the vehicle.

Before manipulating the battery box, a removable member is preferably separated from an isolator connected to the battery, to isolate the battery box from an electronic control device of said battery box.

BREIF DESCRIPTION OF THE DRAWINGS

Other objects, features and advantages of the invention will become apparent on reading the following description given by way of nonlimiting example only with reference to the appended drawings, in which.

DETAILED DESCRIPTION OF THE DRAWINGS

Figure 1:
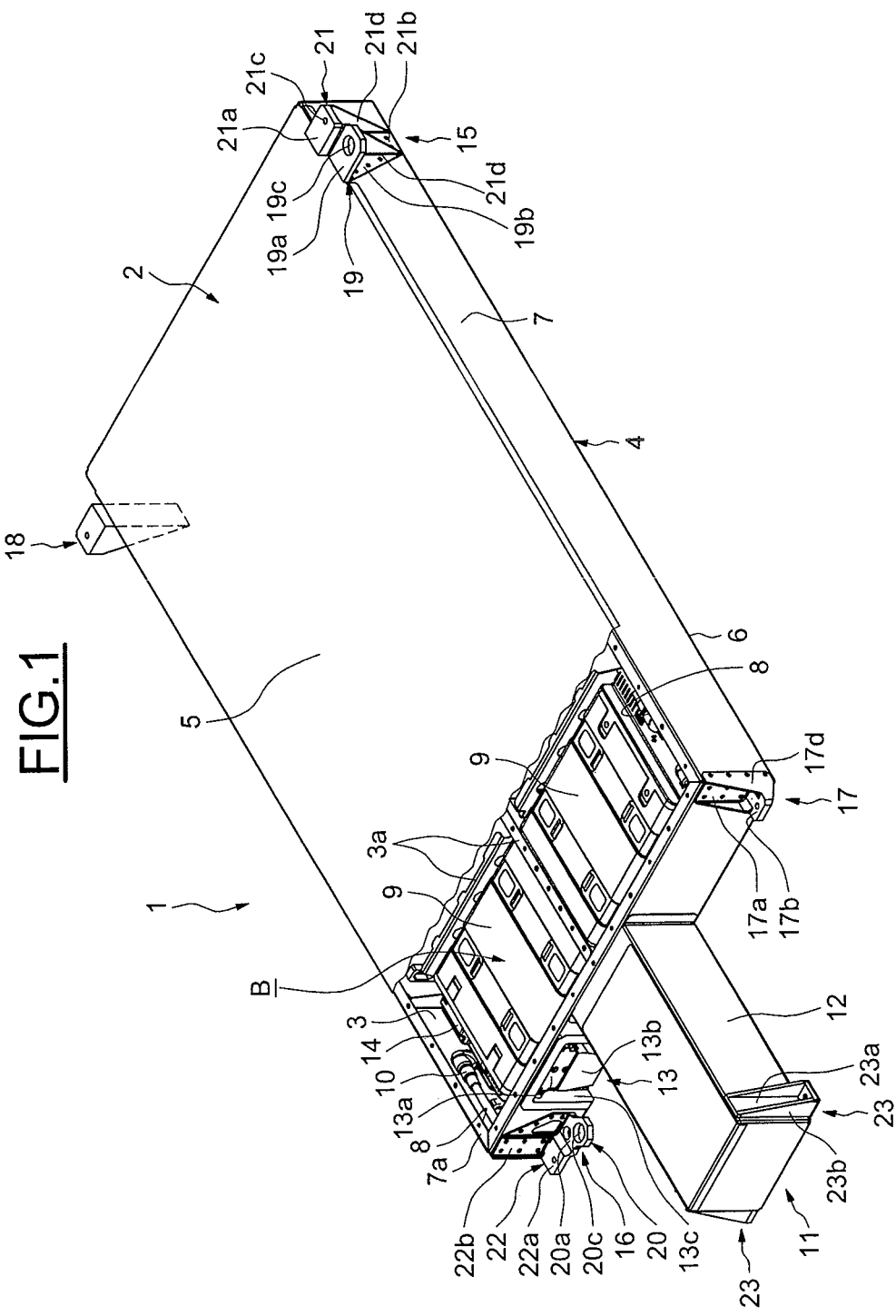
FIG. 1 is a perspective view of a battery box of a first embodiment of the invention.

The battery box 1 shown in FIG. 1 encloses electrical energy storage cell units 9 for supplying an electric or hybrid vehicle with electrical energy.

The battery box 1 comprises an outer casing 2, for example made of metal, of parallelepiped general shape. The outer casing 2 delimits a receiving chamber 3 and includes a support 4 and a removable cover 5 connected to each other.

The support 4 takes the form of a watertight cup obtained by assembling and/or welding relatively thin metal plates. The support 4 comprises a rectangular flat bottom 6 and a lateral frame 7.

This external frame 7 has a peripheral rim 7a bent inward adapted to cooperate with a peripheral area of the cover 5.

The receiving chamber 3 comprises internal partitions 3a delimiting compartments 8 in which there are disposed storage cell units 9 each comprising a plurality of energy storage cell elements in casings.

As shown in FIG. 1, electrical connection cables or wires 10 enable connection in series of the energy storage cell element units 9 to constitute a battery B.

The battery box 1 may comprise an electrical or electronic energy storage cell element management device 11 disposed in a dedicated compartment 12. It will be noted that the dedicated compartment 12 could be integrated into the outer casing 2 of the battery box 1.

Figure 5:
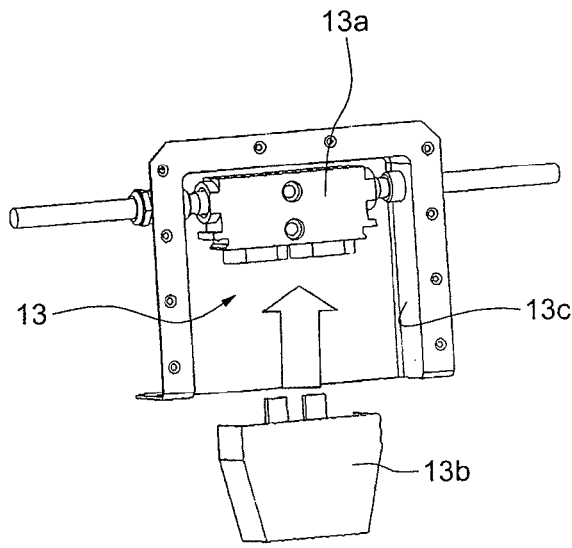
FIG. 5 is a perspective view of an isolator.
Figure 6:
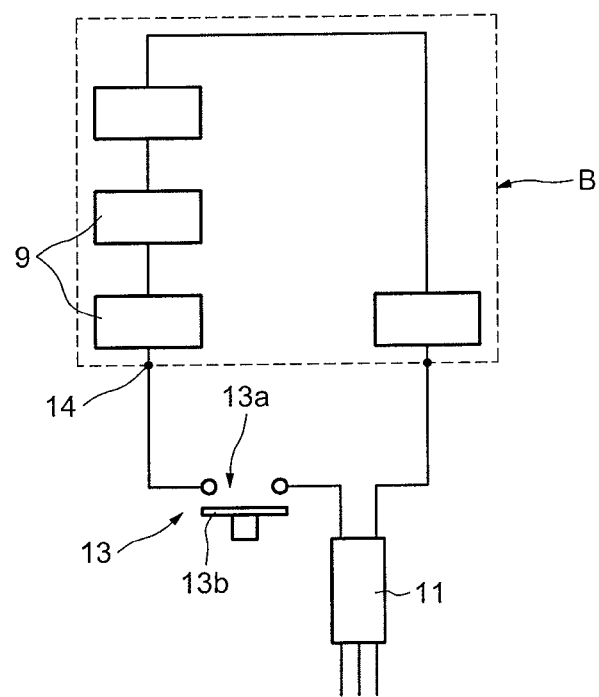
FIG. 6 is a block diagram of the battery box.

As shown more precisely in FIGS. 5 and 6, the electronic device 11 may be electrically connected to one of the electrical terminals 14 of the battery B via an isolator 13 comprising a base 13a provided with spaced electrical connection terminals and a removable member 13b provided with an electrical disconnector rod. The base 13a is fixed to the outer casing 2 and the removable member 13b is installed in an exterior recess 13c of the outer casing 2 so as to be accessible from outside the casing 2 in order to connect it to the base 13a or to separate it from the base 13a. In this way, when the rod 13b is connected to the base 13a, the electronic device 11 is electrically connected to the electrical terminal 14 of the battery B whereas when the rod 13b is separated from the base 13a the battery B is isolated.

The battery box 1 as shown in FIG. 1 may be fixed to a vehicle by its four corners.

To this end, two positioning lugs 15 and 16 and two fixing lugs 17 and 18 are situated on the outer casing 2 of the battery box 1 diagonally opposite each other. Each lug 15, 16, 17 and 18 is situated at a corner of the battery box 1 and may be bolted to the lateral frame 7 of the outer casing 2.

The positioning lugs 15, 16 and the fixing lugs 17, 18 have the general shape of a "bracket". A "bracket" is defined as any right-angled L-section metal part designed for fixing assemblies together.

Figure 2:
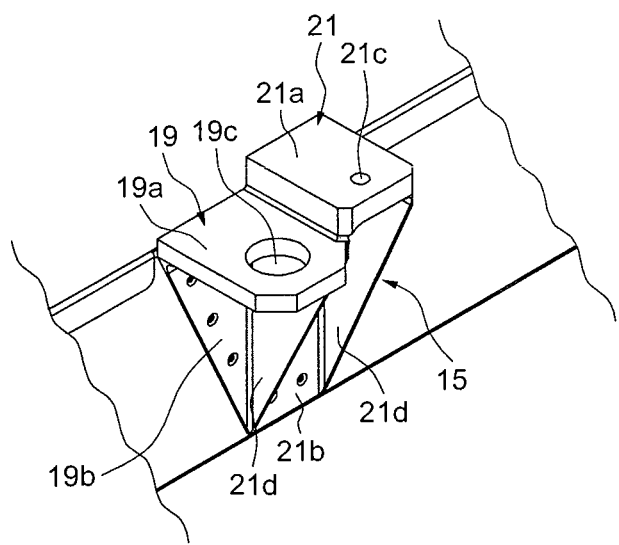
FIG. 2 is a detailed view of a positioning lug from FIG. 1.

As may be seen better in FIG. 2, the positioning lug 15 comprises a positioning bracket 19 and a fixing bracket 21 connected to the positioning bracket. The bracket 19 comprises a base 19a and a fixing plate 19b designed to be fixed to the frame 7 of the battery box 1. The base 19a of the positioning bracket 19 has a passage 19c through it of cylindrical general shape.

The fixing bracket 21 comprises a base 21a and a fixing plate 21b designed to the fixed to the frame 7 of the casing 2. The fixing bracket 21 comprises ribs 21d on either side of the fixing bracket 21. These ribs 21d stiffen the fixing lug 15. The two brackets 19, 21 are connected to each other by one of the ribs 21d.

The positioning lug 16 comprises a positioning bracket 20 (FIG. 1) and a fixing bracket 22 connected to the positioning bracket 20. The bracket 20 includes a base 20a and a plate for fixing it to the frame 7. The base 20a has a passage 20c through it. The fixing bracket 22 includes a base 22a and a fixing plate 22b.

The bases 19a and 20a may have a semicircular, rectangular or square shape. The base 21a of the fixing bracket 21 includes a screwthread 21c (FIG. 2) capable of cooperating with, for example, a threaded rod (not shown). The base 22a includes an identical thread that is seen in FIG. 1.

By way of nonlimiting example, the fixing plate 19b is shown in FIGS. 1 and 2 with a triangular general shape and the fixing plate 21b is shown with a rectangular general shape. The fixing plate 22b is also rectangular. It will be noted that the fixing plates could, generally speaking, have a geometrical shape with three or four sides.

It will be noted that the bases 19a and 21a are disposed at substantially the same level, being slightly offset, the base 21a being situated above the level of the base 19a. The two bases 19a and 21a are situated slightly above the level of the cover 5. The bases 20a and 22a for their part are situated slightly below the level of the bottom 6.

The base 17b is situated substantially at the level of the bottom 6 whereas the corresponding base of the fixing lug 18 is substantially at the level of the cover 5. This arrangement in space of the various bases is not indispensable but has the advantage of optimum balancing of the battery box 1 during mounting operations, which this arrangement facilitates.

The fixing lug 17 comprises a bracket 17a with a base 17b. Two ribs 17d are fixed on each side of the bracket 17a. The base 17b includes a screwthread adapted to cooperate with a threaded rod (not shown). The fixing lug 17 is fixed to the frame 7 at one of its corners.

The second fixing lug 18, fixed to the corner of the frame 7 diametrically opposite the fixing lug 17, faces the fixing bracket 21 of the positioning lug 15.

Thus the battery box 1 may be fixed to a vehicle by four fixing points defined by the fixing brackets 21 and 22 and the fixing lugs 17 and 18.

The positioning lugs 15, 16 and the fixing lugs 17, 18 are preferably made of metal.

It will be noted that the fixing brackets 21 and 22 could be independent of the positioning brackets 19 and 20. As a general rule, the positioning lugs 15, 16 and the fixing lugs 17, 18 could be situated elsewhere on the outer casing 3 of the battery box 1.

The number points for fixing the battery box 1 to a vehicle could also be greater than four.

As shown in FIG. 1, the dedicated compartment 12 in which is located the electrical or electronic energy storage cell element management device 11 comprises two fixing lugs 23 situated on either side of the dedicated compartment 12. Each fixing lug 23 comprises a bracket part 23a and two ribs 23b for stiffening the fixing lug 23.

Figure 3:
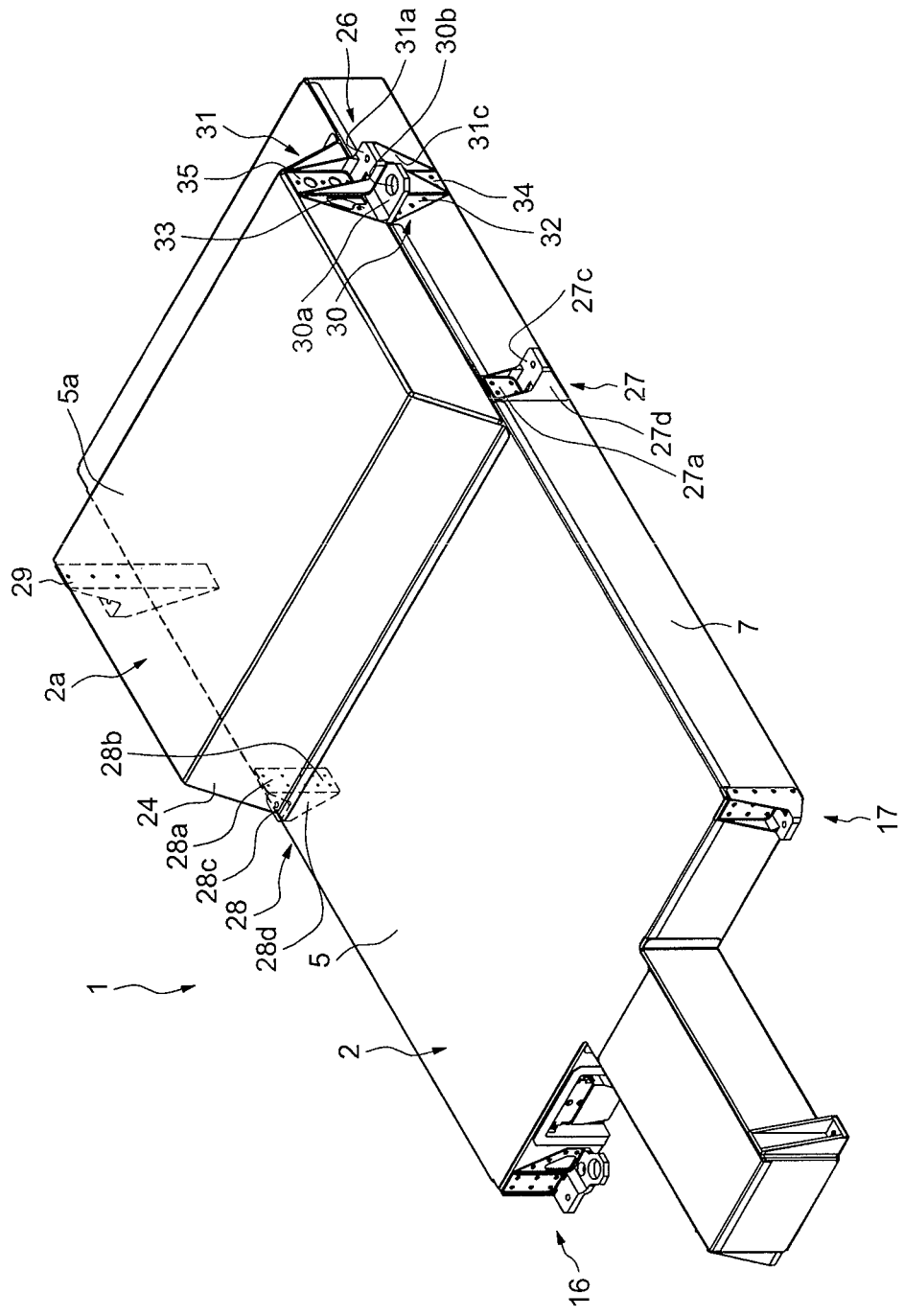
FIG. 3 is a perspective view of a second embodiment of a battery box of another aspect of the invention.

The battery box 1 as shown in FIG. 3, in which analogous elements bear the same references, comprises an outer casing 2 as defined in FIG. 1 and a second casing 2a comprising a lateral frame 24 delimiting a second interior chamber receiving energy storage cell elements, in order to supply an electric or hybrid vehicle with electrical energy as a function of the energy requirement. The casing 2a comprises a cover 5a placed on top of the cover 5 and connected to the latter by the frame 24.

In the same manner as the receiving chamber 3 shown in FIG. 1, the second receiving chamber delimited by the frame 24 comprises internal partitions, not shown in the figure, delimiting compartments receiving energy storage cell element units.

The battery box 1 may, as shown in FIG. 3, be fixed to a vehicle by six fixing points.

To this end, in addition to the positioning lug 16 and the fixing lug 17 mounted on the outer casing 2, a positioning lug 26 is mounted both on the outer casing 2 and on the outer casing 2a. The two positioning lugs 16 and 26 are substantially diagonally opposite each other. Two supplementary fixing lugs 27 and 28 are mounted on the outer casing 2 and a fixing lug 29 is mounted both on the outer casing 2 and on the outer casing 2a. The fixing lugs 27 and 28 are situated laterally on either side of the battery box 1 and the fixing lugs 17 and 29 are substantially diagonally opposite each other.

The positioning lug 26 comprises a positioning system 30 and a fixing system 31. The positioning system 30 is composed of two brackets 32, 33 connected by a common base 30a. The brackets 32 and 33 each comprise a fixing plate fixed to each of the outer casings 2 and 2a, respectively, of the battery box 1. In the example shown, these fixing plates have a triangular general shape; it will be noted that they could be of rectangular shape. The base 30a common to the two brackets 32 and 33 includes a passage 30b of cylindrical general shape. It will be noted that the shape of the passage 30b could be different, for example conical.

The fixing system 31 is composed of two fixing brackets 34, 35 connected by a common base. The brackets 34 and 35 each comprise a fixing plate fixed to each of the outer casings 2 and 2a, respectively, of the battery box 1. In the example shown, the fixing plates have a rectangular general shape; it will be noted that they could be of triangular shape. The base 31a common to the two brackets 34 and 35 includes a screwthread.

The fixing system 31 comprises, as shown in FIG. 3, two ribs 31c on each side of the system 31 in order to stiffen the fixing lug 26. The positioning system 30 and the fixing system 31 are connected to each other by one of the ribs 31c.

The second fixing lug 29 has substantially the same structure as the fixing system 31 of the positioning lug 26.

The third and fourth fixing lugs 27, 28 each comprises two fixing plates 27a, 28a on either side of a base 27c, 28c to form two brackets. Each fixing lug 27, 28 is mounted laterally on the outer casing 2 of the battery box 1. Two ribs 27d, 28d are fixed on each side of the fixing lugs 27, 28. Each base 27c, 28c includes a screwthread adapted to cooperate with a threaded rod (not shown). It will be noted that the bases 30a and 31a are situated substantially at the level of the cover 5 i.e. at the level of the separation between the outer casing 2 and the outer casing 2a. The bases 27c and 28c are situated substantially in the middle of the frame 7.

It will be noted that the four fixing lugs 17, 27, 28 and 29 could be identical.

Figure 4:
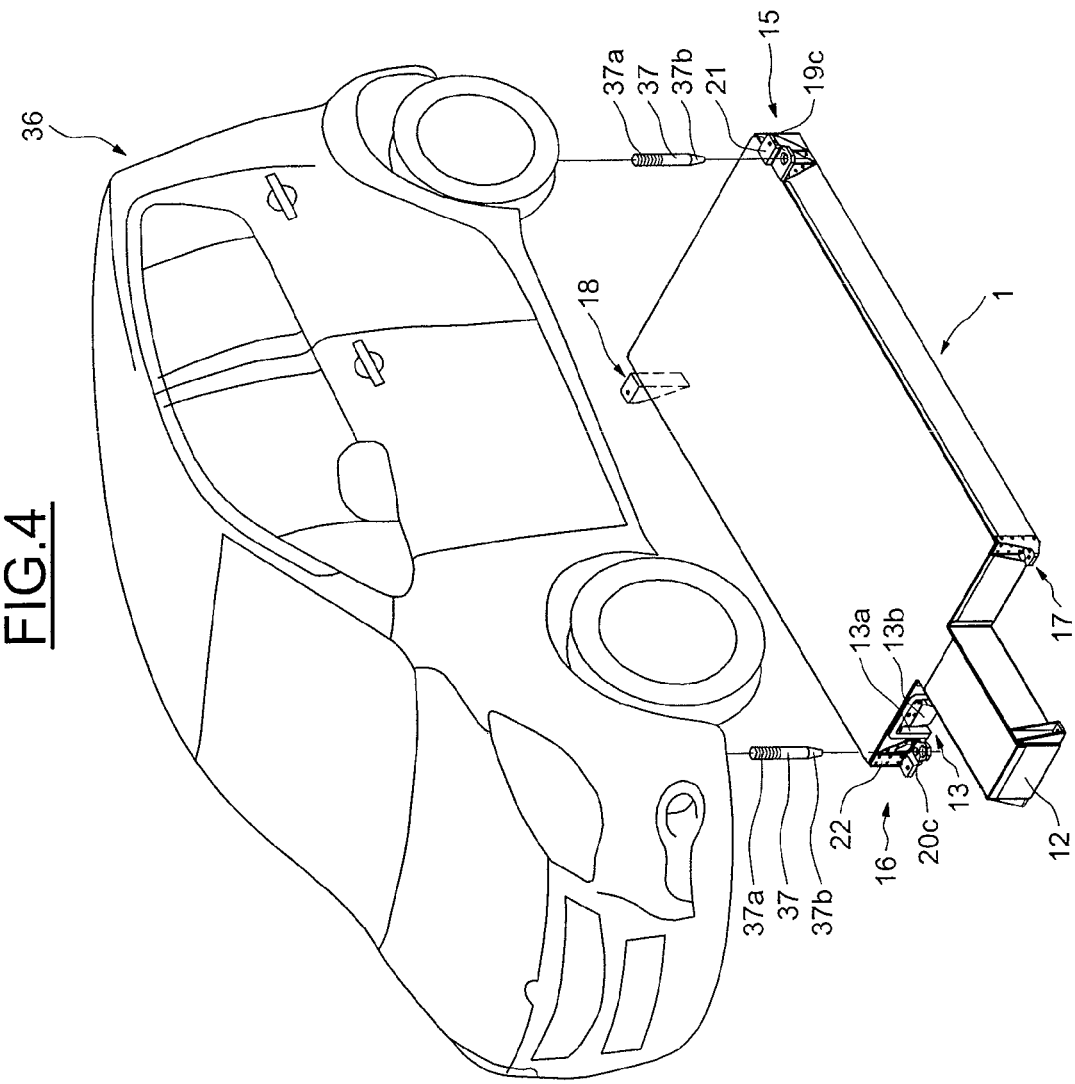
FIG. 4 shows diagrammatically the mounting of a battery box of the invention on a vehicle.

The mounting of a battery box 1 according to FIG. 2 on a vehicle 36 is shown in FIG. 4.

The vehicle 36 is shown by way of nonlimiting example. The mounting method could be adapted to any type of motor vehicle. The mounting of the battery box 1 under the chassis of the vehicle 36 comprises a step of positioning and a step of fixing the battery box 1.

Before manipulating the battery box 1, it is necessary to disconnect the isolator 13 of the electronic device 11 situated in the dedicated compartment 12. For this, it is necessary to separate the removable member 13b, for example a disconnector rod, from the base 13a situated on the outer casing 3 of the battery box 1.

Two positioning studs 37 are used to position the battery box 1. Each positioning stud 37 is of cylindrical general shape and comprises a threaded cylindrical end 37a and an unthreaded conical opposite end 37b.

The first step consists in screwing the threaded end 37a of the positioning stud 37 into a screwthread (not shown) provided under the chassis of the vehicle 36. To this end, to provide access to the underside of the chassis of the vehicle 36, either the vehicle 36 may be raised by means of a standard lifting device or the vehicle 36 may be positioned over a pit provided in the floor.

Once the positioning studs 37 have been screwed to the vehicle 36, it is necessary to create relative movement between the battery box 1 and the vehicle 36. To this end, the vehicle 36 may be lowered, if it has been raised, or the battery box 1 may be raised, or the vehicle 36 may be lowered and the battery box 1 raised, so as to position the positioning studs 37 in the passages 19c and 20c respectively provided on the positioning lugs 15 and 16.

When the conical end 37b of each of the two positioning lugs 37 is inserted in the passages 19c and 20c, the relative movement between the battery box 1 and the vehicle 36 is continued so as to position the battery box 1 in a housing (not shown) situated under the chassis of the vehicle 36.

The passages 19c and 20c advantageously have a diameter slightly greater than the diameter of the positioning studs 37.

When the battery box 1 is correctly positioned under the chassis of the vehicle 36, the battery box 1 must be fixed to the chassis of the vehicle 36. The fixing lugs 17, 18 and the fixing brackets 21 and 22 of the positioning lugs 15 and 16 are used for this purpose. Fixing is effected by means of bolts, for example. It will be noted that any other means enabling fixing of the box 1 to the vehicle 36 may be envisaged, such as a quarter-turn fixing, latches or hooks.

Once the battery box 1 has been positioned and fixed to the vehicle 36, the disconnector rod 13b is coupled with the base 13a of the isolator 13 to reconnect the electronic device 11 to the energy storage cell element units 9.

The reverse procedure is employed to demount the battery box 1 from the vehicle 36. First the disconnector rod 13b is separated from the base 13a of the isolator 13. The bolts fixing the fixing lugs 17, 18 and the positioning lugs 15 and 16 are then unscrewed.

When changing the battery box 1, it is not always necessary to unscrew the positioning studs 37. Once the positioning studs 37 have been screwed to the chassis of the vehicle 36, they may be unscrewed only to change them if they are defective.

It will be noted that the procedure for mounting or demounting a battery box is not limited to the battery box described above and applies to any type of battery box to which are fixed positioning lugs adapted to receive positioning studs.

Thanks to the arrangement that has just been described, the battery box is easily and quickly positioned and fixed to an electric or hybrid motor vehicle.

The invention claimed is:

1. A vehicle battery box comprising at least one outer casing delimiting a chamber receiving the battery and comprising a support and a removable cover connected to each other, the box comprising:
   a first positioning lug;
   a second positioning lug; and
   fixing lugs for fixing said battery box to the vehicle, said first and second positioning lugs and said fixing lugs being mounted on the outer casing,
   wherein each of the first and second positioning lugs comprises:
   a positioning L-shaped bracket, having a first base comprising a passage receiving a positioning stud having a threaded end adapted to be screwed under a chassis of the vehicle and a conical end adapted to be inserted in said receiving passage and a fixing plate fixed to the outer casing of the battery box, and a fixing L-shaped bracket connected to the positioning L-shaped bracket and having a second base and a fixing plate fixed to the outer casing of the battery box, said first and second bases of the first positioning lug being disposed at substantially the same level, above the level of the cover, and the first and second bases of the second positioning lug being situated below the level of the bottom of the box.

2. The battery box according to claim 1, comprising a second outer casing delimiting a second battery receiving chamber and comprising a cover placed over the first cover.

3. The battery box according to claim 2, wherein one of said first and second positioning lugs comprises two supplementary brackets connected to two first brackets, said supplementary brackets being mounted on the second outer casing.

4. The battery box according to claim 1, comprising internal partitions delimiting compartments in said receiving chamber, said compartments being adapted to receive energy storage cell units.

5. The battery box according to claim 1, comprising at least one exterior recess for receiving a removable member of an isolator connected to the battery.

6. A method of mounting a battery box on a vehicle, said battery box comprising at least one outer casing delimiting a chamber receiving the battery and comprising a support and a removable cover connected to each other, the box comprising:
   a first positioning lug;
   a second positioning lung; and
   fixing lugs for fixing said battery box to the vehicle, said first and second positioning lugs and said fixing lugs being mounted on the outer casing,
   wherein each of the first and second positioning lugs comprises:
      a positioning L-shaped bracket, having a first base comprising a passage receiving a positioning stud having a threaded end adapted to be screwed under a chassis of the vehicle and a conical end adapted to be inserted in said receiving passage and a fixing plate fixed to the outer casing of the battery box, and
      a fixing L-shaped bracket connected to the positioning L-shaped bracket and having a second base and a fixing plate fixed to the outer casing of the battery box, said first and second bases of the first positioning lug being disposed at substantially the same level, above the level of the cover, and the first and second bases of the second positioning lug being situated below the level of the bottom of the box, wherein the method comprises the steps of:
   screwing positioning studs to the vehicle;
   placing the battery box on the vehicle so that the positioning studs are inserted in respective ones of the first and second positioning lugs provided on said battery box; and
   fixing the battery box to the vehicle with the fixing lugs provided on the battery box.

7. The mounting method according claim 6, wherein two positioning studs are screwed to the vehicle.

8. The mounting method according to claim 6, wherein the vehicle is lowered and/or the battery box is raised to carry out the positioning step.

9. The mounting method according to claim 6, wherein, when positioning the battery box, the positioning lugs are guided by conical ends of the positioning studs.

10. The mounting method according to claim 6, wherein the fixing lugs are fixed to the vehicle with bolts.

11. The mounting method according to claim 6, wherein, before manipulating the battery box, a removable member is separated from an isolator connected to the battery to isolate the battery box from an electronic device for management of said battery box.

* * * * *